US012230899B2

(12) United States Patent
Pandey et al.

(10) Patent No.: US 12,230,899 B2
(45) Date of Patent: Feb. 18, 2025

(54) DUAL BAND ANTENNA

(71) Applicant: ROGERS CORPORATION, Chandler, AZ (US)

(72) Inventors: Shailesh Pandey, Woburn, MA (US); Yajie Chen, Brighton, MA (US); Lance Young, Shrewsbury, MA (US); Kristi Pance, Auburndale, MA (US); Lori Brock, Ipswich, MA (US)

(73) Assignee: ROGERS CORPORATION, Chandler, AZ (US)

( * ) Notice: Subject to any disclaimer, the term of this patent is extended or adjusted under 35 U.S.C. 154(b) by 224 days.

(21) Appl. No.: 17/948,766

(22) Filed: Sep. 20, 2022

(65) Prior Publication Data

US 2023/0088794 A1 Mar. 23, 2023

Related U.S. Application Data

(60) Provisional application No. 63/247,570, filed on Sep. 23, 2021.

(51) Int. Cl.
*H01Q 9/04* (2006.01)
*H01Q 1/38* (2006.01)
*H01Q 5/392* (2015.01)

(52) U.S. Cl.
CPC ............. *H01Q 9/0414* (2013.01); *H01Q 1/38* (2013.01); *H01Q 5/392* (2015.01); *H01Q 9/04* (2013.01)

(58) Field of Classification Search
CPC ........ H01Q 9/0414; H01Q 5/392; H01Q 1/38; H01Q 9/04
See application file for complete search history.

(56) References Cited

U.S. PATENT DOCUMENTS

| | | | | |
|---|---|---|---|---|
| 11,069,953 B2 * | 7/2021 | Rogers | H01Q 9/0428 |
| 2003/0231134 A1 * | 12/2003 | Yarasi | H01Q 9/0442 343/702 |
| 2006/0097922 A1 | 5/2006 | Mahmoud | |
| 2012/0154235 A1 | 6/2012 | Nakamura et al. | |
| 2016/0013558 A1 * | 1/2016 | Hwang | H01Q 9/0414 343/906 |
| 2020/0212585 A1 * | 7/2020 | Chayat | H01Q 5/378 |
| 2020/0251824 A1 | 8/2020 | Monma et al. | |

FOREIGN PATENT DOCUMENTS

| | | |
|---|---|---|
| CN | 202333124 U | 7/2012 |
| EP | 1276170 A1 | 1/2003 |

OTHER PUBLICATIONS

Bonilla et al., "Miniaturization of a microstrip antenna with magneto-dielectrics substrates for a passive tag RFID operating at 915 MHz on a metallic surface" 2014 IEEE Brasil RFID. IEEE, (Sep. 2014) pp. 61-63.

(Continued)

*Primary Examiner* — Hai V Tran
(74) *Attorney, Agent, or Firm* — CANTOR COLBURN LLP

(57) ABSTRACT

A dual band antenna includes a substrate having a magnetodielectric material, and an electrically conductive patch disposed on the substrate, wherein the patch has at least one in-plane cutout having an H-shape or an I-shape, as observed in a plan view of the patch.

19 Claims, 15 Drawing Sheets

(56) References Cited

OTHER PUBLICATIONS

International Search Report with Written Opinion issued in International Application No. PCT/US2022/044199; International Filing Date Sep. 21, 2022; Date of Mailing Jan. 26, 2023 (16 pages).
Mosallaei et al., “Embedded-circuit and RIS meta-substrates for novel antenna designs” IEEE Antennas and Propagation Society Symposium, 2004, vol. 1. IEEE, (Jun. 2004) pp. 301-304.
Second Written Opinion issued in International Application No. PCT/US2022/044199; International Filing Date Sep. 21, 2022; Date of Mailing Aug. 10, 2023 (5 pages).

* cited by examiner

DUAL BAND ANTENNA

CROSS REFERENCE TO RELATED APPLICATIONS

This application claims the benefit of U.S. Provisional Application Ser. No. 63/247,570, filed Sep. 23, 2021, which is incorporated herein by reference in its entirety.

BACKGROUND

The present disclosure relates generally to antennas, particular to dual band antennas, and more particularly to dual band, dual feed, dual polarization antennas.

Applications involving emergency calling (eCall) and autonomous driving require precise point positioning and tracking of at least two frequency bands from multiple satellite constellations. While existing antennas may be suitable for their intended purpose in such applications, there remains a need for an improved antenna in a more compact design.

BRIEF SUMMARY

An embodiment includes a dual band antenna as defined by the appended independent claims. Further advantageous modifications of the dual band antenna are defined by the appended dependent claims.

In an embodiment, a dual band antenna includes a substrate having a magnetodielectric material, and an electrically conductive patch disposed on the substrate, wherein the patch has at least one in-plane cutout having an H-shape or an I-shape, as observed in a plan view of the patch.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered or illustrated alike in the accompanying Figures.

Figure 1:
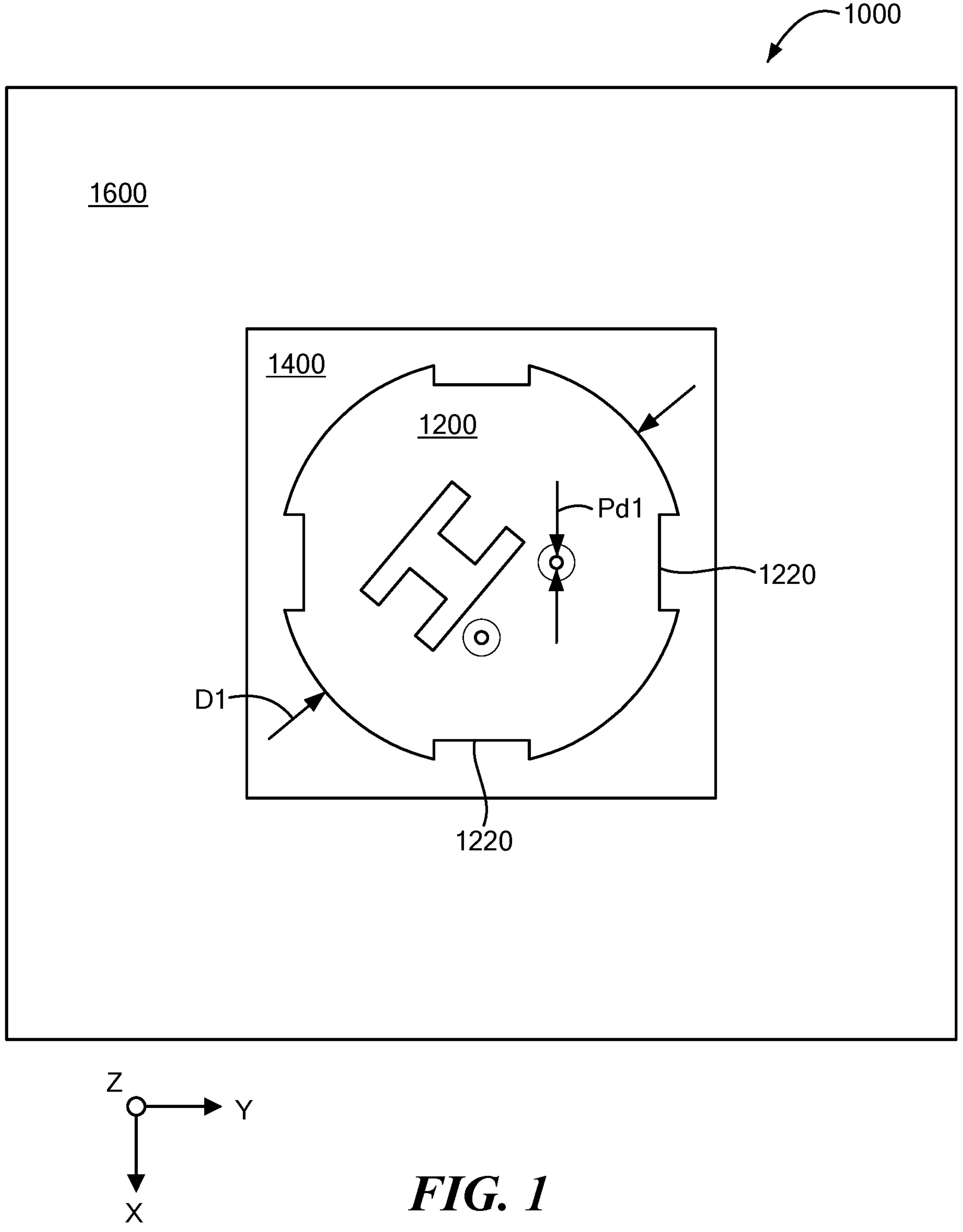
FIG. 1 depicts a plan view of an example design-1 antenna, in accordance with an embodiment.

One skilled in the art will understand that the drawings, further described herein below, are for illustration purposes only. It will be appreciated that for simplicity and clarity of illustration, elements shown in the figures have not necessarily been drawn to scale. For example, the dimensions or scale of some of the elements may be exaggerated relative to other elements for clarity. Further, where considered appropriate, reference numerals may be repeated among the figures to indicate corresponding or analogous elements, or analogous elements may not be repetitively enumerated in all figures where it will be appreciated and understood that such enumeration where absent is inherently disclosed.

DETAILED DESCRIPTION

As used herein, the phrase "embodiment" means "embodiment disclosed and/or illustrated herein", which may not necessarily encompass a specific embodiment of an invention in accordance with the appended claims, but nonetheless is provided herein as being useful for a complete understanding of an invention in accordance with the appended claims.

Although the following detailed description contains many specifics for the purposes of illustration, anyone of ordinary skill in the art will appreciate that many variations and alterations to the following details are within the scope of the appended claims. For example, where described features may not be mutually exclusive of and with respect to other described features, such combinations of non-mutually exclusive features are considered to be inherently disclosed herein. Additionally, common features may be commonly illustrated in the various figures but may not be specifically enumerated in all figures for simplicity, but would be recognized by one skilled in the art as being an explicitly disclosed feature even though it may not be enumerated in a particular figure. Accordingly, the following example embodiments are set forth without any loss of generality to, and without imposing limitations upon, the claimed invention disclosed herein.

Precise point positioning for GPS (Global Positioning System) frequencies greater than the GPS L2 band in autonomous driving applications requires tracking of at least two frequency bands from multiple satellite constellations, such as for example GPS L5 and Galileo E5b. Existing multiband GPS antennas typically combine a single GPS L5 and GPS L1 band into a stacked patch antenna, but do not address multiple satellite constellations, unless the antenna is large (for example 50 mm×50 mm or 70 mm×70 mm). By increasing the instantaneous bandwidth of each patch antenna, a single antenna can be made to cover at least two, and potentially three constellations, with two bands in each. In the prior art, a first current coverage scenario spans the GPS L5 and Galileo E5b bands but not the GPS L2 band, and a second current coverage scenario spans the BDS B2, GPS L1, and GLO L1, bands. As discussed herein below, an improved coverage scenario of an antenna as disclosed herein spans the GPS L5 and GPS L2 bands, and discriminates out the Galileo E5b band.

An embodiment of an antenna as disclosed herein is a dual feed and dual polarization antenna that may be fabricated by printing or otherwise depositing an electrically conductive patch onto a magnetodielectric substrate. In an embodiment the dual polarization is circular polarization, and more particularly right-hand-circular-polarization (RHCP), or left-hand-circular-polarization (LHCP), by alternating the phases in the signal probes.

A prototype antenna design in accordance with an embodiment disclosed herein was fabricated on a magneto-dielectric material with achieved properties (i.e., permittivity, and permeability with loss) developed in the laboratory. The goal was to use the material and demonstrate the miniaturization of the antennas for specific applications. The technical application herein mentioned is for GPS (Global Positioning System). The GPS bands for which the disclosed antenna is operational includes at least two different bands, GPS L2 and GPS L5 bands, where the L2 band has a nominal center frequency at 1227.6 MHz with a bandwidth of 11 MHz, and the L5 band has a nominal center frequency at 1176.45 MHz with a bandwidth of 12.5 MHz. A third band that the disclosed antenna is operational at is the GPS L1 band, having a nominal center frequency of 1575.42 MHz with a bandwidth of 15.345 MHz The shape of the electrically conductive patch that actively radiates EM energy has a uniquely defined profile with slots, shapes, and notches, that contribute to an improved bandwidth, as well as tuning of the entire band of operation. The antenna design developed on the magnetic materials covers the required band of operation which also includes the lower bands of Galileo E5b and E5a.

An embodiment of the disclosed antenna design disclosed herein offers a wide impedance bandwidth of equal to or greater than 75 MHz, a wide axial ratio bandwidth of equal to or less than 1.5 dBi, a radiation efficiency of equal to or greater than 52%, and a super wide axial ratio bandwidth at 3 dBi of equal to or greater than 10 MHz, alternatively equal to or greater than 50 MHz, further alternatively equal to or greater than 100 MHz, within the band of operation. The design was made on a single layer magnetodielectric material slab, as compared to existing stacked layers of similar commercial antenna designs in the market.

An embodiment of the disclosed antenna has a shaped electrically conductive patch antenna that is substantially circular with shaped internal cutouts, and notches on the peripheral edge, that are designed and disposed on a magnetodielectric substrate with a dielectric property, which has both permittivity and permeability values. Two strategically placed electrical signal probes provide electromagnetic (EM) energization to the patch. The advantage of the magnetodielectric substrate is the presence of an electric current as well as a magnetic current, when electromagnetically excited, because the material's constituent of permeability is utilized to improve the antenna performances like radiation and matching bandwidth. The permittivity and permeability values contribute to the miniaturization factor of an antenna disclosed herein. An advantage of the antenna design is the material property, which contributes to the miniaturization of the antenna and leads a design that achieves the desired antenna performance characteristics.

The magnetodielectric substrates suitable for a purpose disclosed herein may be a magnetic particle or magnetic particle-polymer composite. In an embodiment, the magnetic permeability is 1.5-15, the magnetic loss tangent is 0.01-0.10, the permittivity is 5-15, and the dielectric loss tangent is 0.002-0.01, over a frequency band of 100 MHz to 2 GHz. In an embodiment, the magnetodielectric composite can comprise a magnetic filler (ferrite or metallic particle) of 10-80 vol %, and polymer of 20-90 vol %.

An example magnetodielectric substrate found to be useful for a purpose disclosed herein is $Ba_{1.5}Sr_{1.5}Co_{2.12}Mo_{0.12}Fe_{22.16}O_{41}$, 45 vol % ferrite, 55 vol % LDPE. This particular magnetodielectric substrate has the following properties at 1.2 GHz: permeability equal to 1.80; magnetic loss tangent equal to 0.03; permittivity equal to 6.269; and, dielectric loss tangent equal to 0.0037.

An embodiment, as shown and described by the various figures and accompanying text, provides a dual band antenna useful, for example, in eCall and autonomous driving applications. Another application that is contemplated is in a six-band Global Navigation Satellite System (GNSS) chipset for automotive applications.

An embodiment of an antenna as disclosed herein is suitable for applications covering the entire low L-band (1164-1300 MHz) for GNSS, e.g., L5/L2, E5a/E5b/E6, G2/G3, B2/B3, BDS B2, GPS L1, and GLO L1, bands.

As used herein, the term monolithic means a structure integrally formed from a single material composition.

While embodiments illustrated and described herein depict an example dual band antenna with an electrically conductive patch having a particular two-dimensional (2D) plan view geometry, particularly with respect to the in-plane cutout, it will be appreciated that this geometry is merely one example of many geometries that may be employed in the design of a dual band antenna as disclosed herein depending on the desired performance characteristics (polarization, operating frequencies, bandwidths, gains, return losses, radiation patterns, etc.) of the dual band antenna. It will also be appreciated that the disclosed geometry may be modified without departing from a scope of the invention. As such, the disclosure herein applies to any dual band antenna design that falls within the ambit of the appended claims, and any 2D geometry of the electrically conductive patch that falls within the ambit of the disclosure herein, and is suitable for a purpose disclosed herein, is contemplated and considered to be complementary to the particular embodiments disclosed herein.

Figure 2:
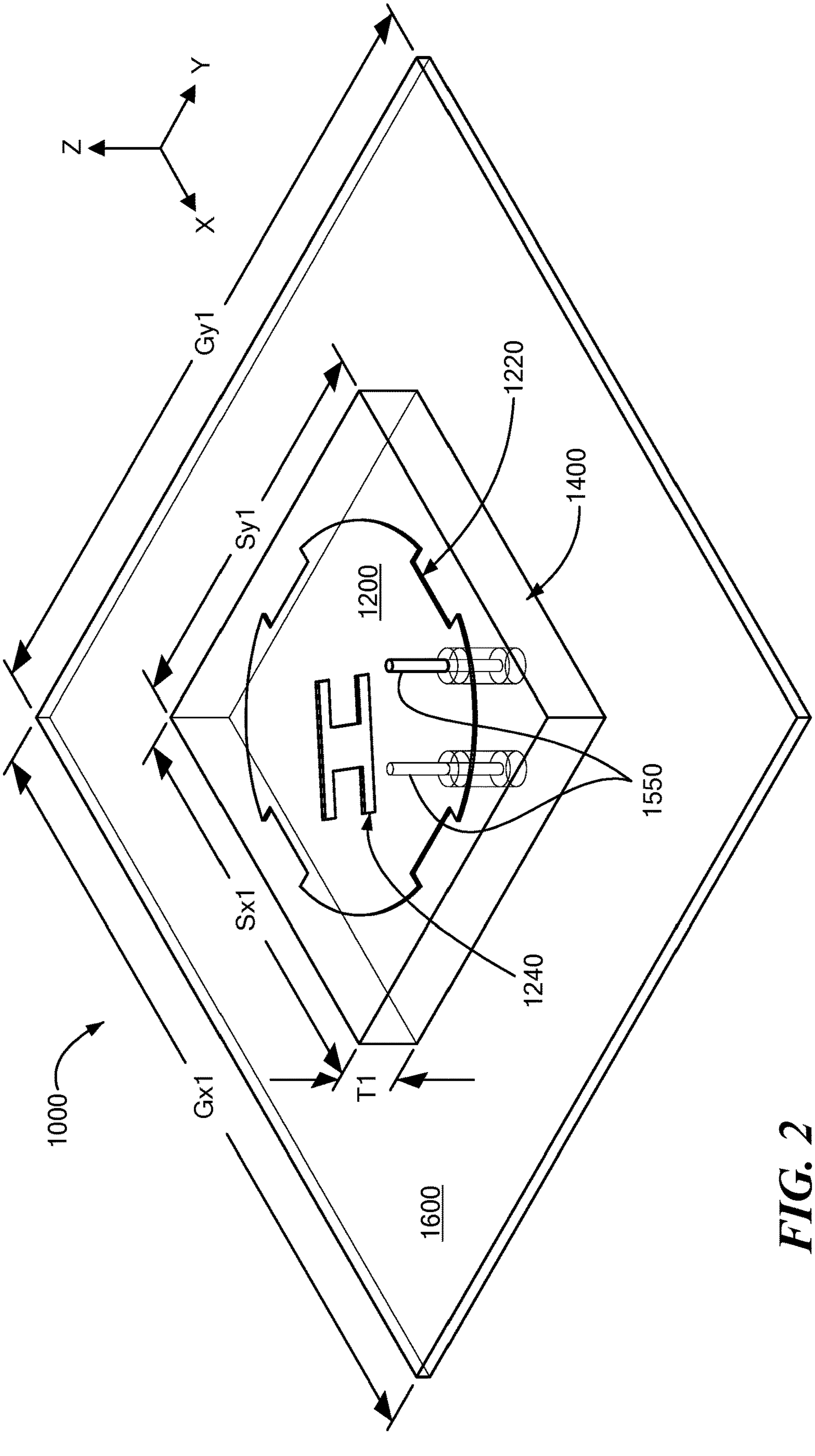
FIG. 2 depicts a rotated isometric view of the example design-1 antenna of FIG. 1, in accordance with an embodiment.
Figure 3:
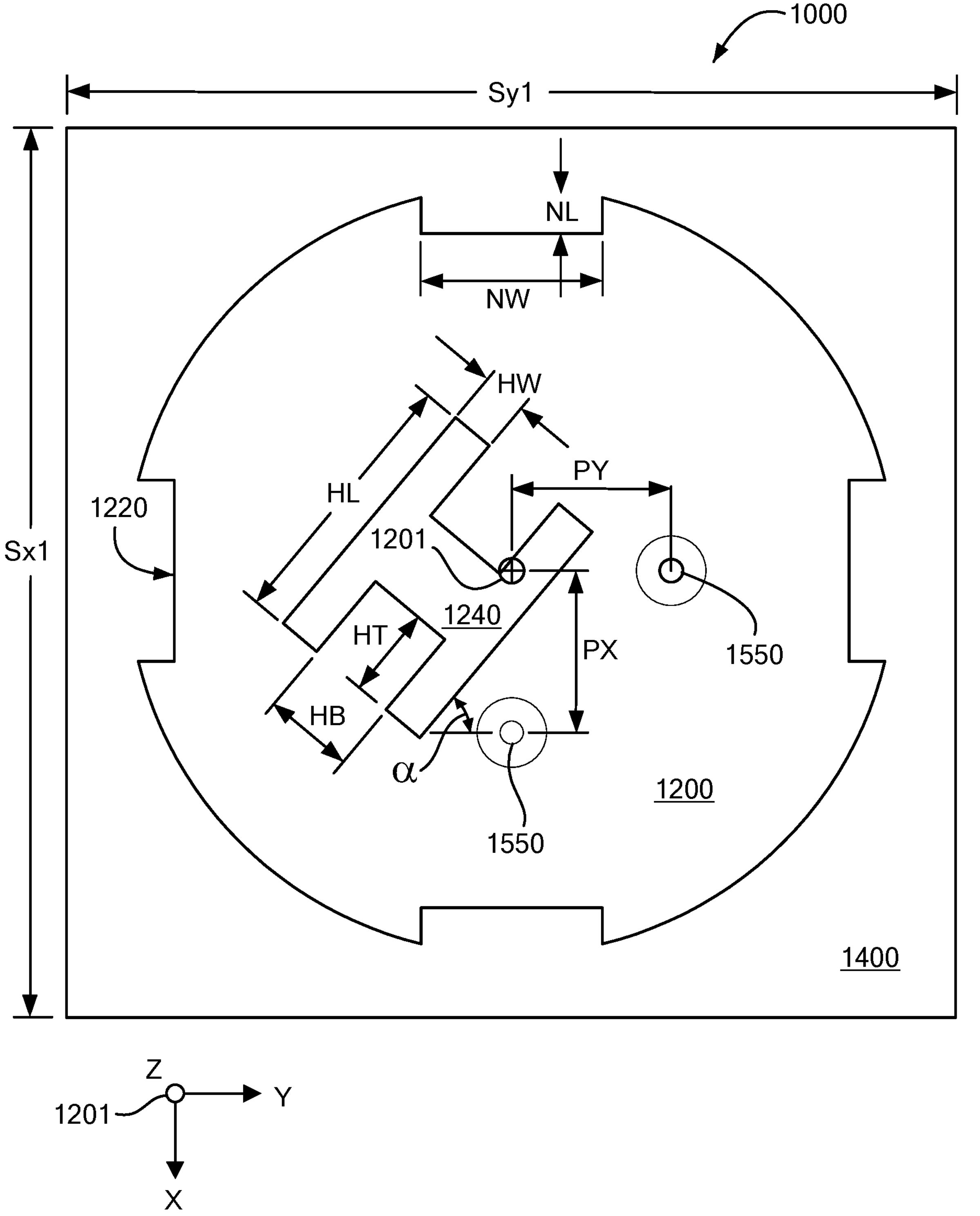
FIG. 3 depicts a plan view of a portion of the example design-1 antenna of FIG. 1 with example fabrication details, in accordance with an embodiment.
Figure 4:
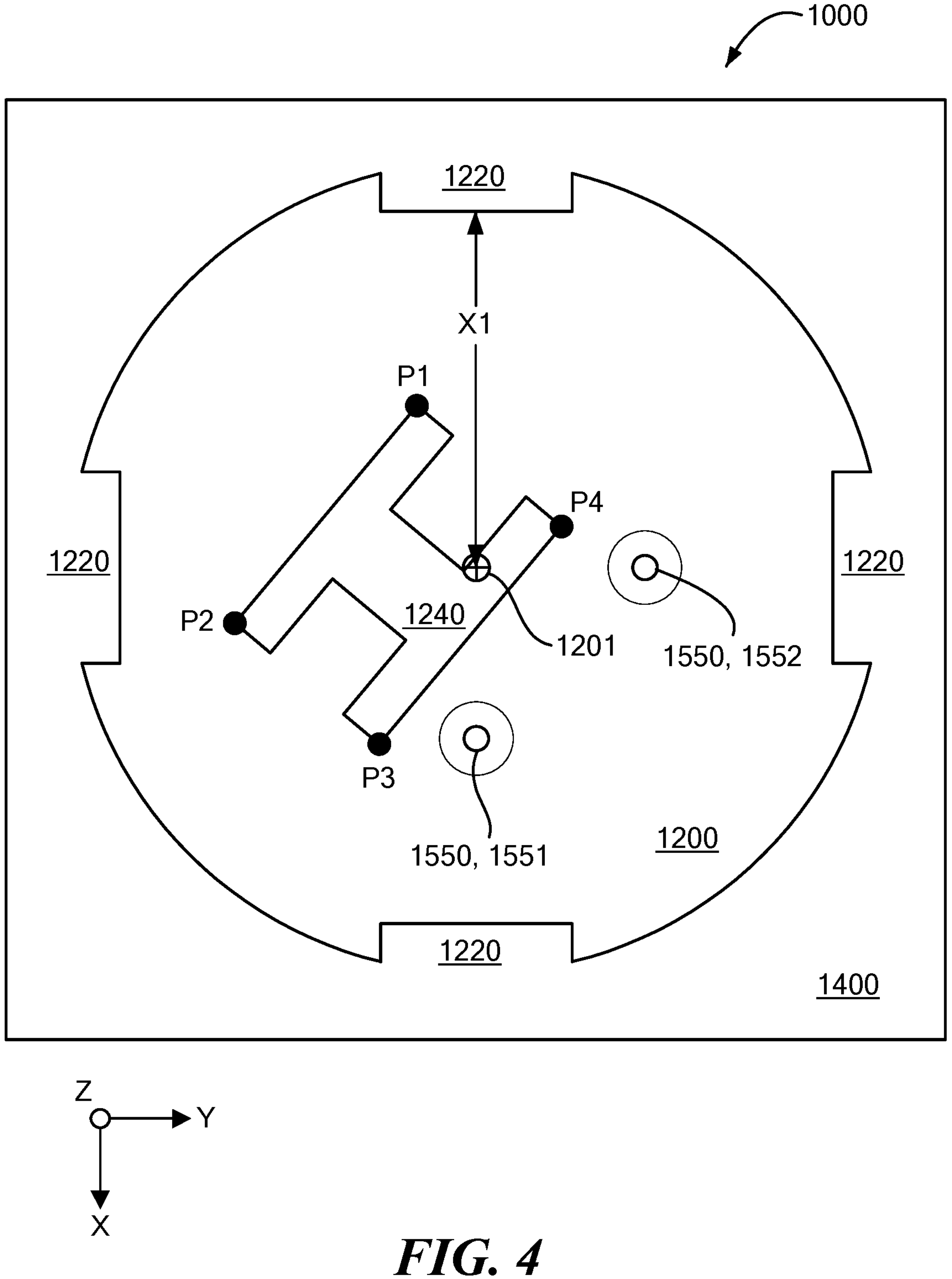
FIG. 4 depicts another plan view of a portion of the example design-1 antenna of FIG. 1 with other example fabrication details, in accordance with an embodiment.
Figure 5:
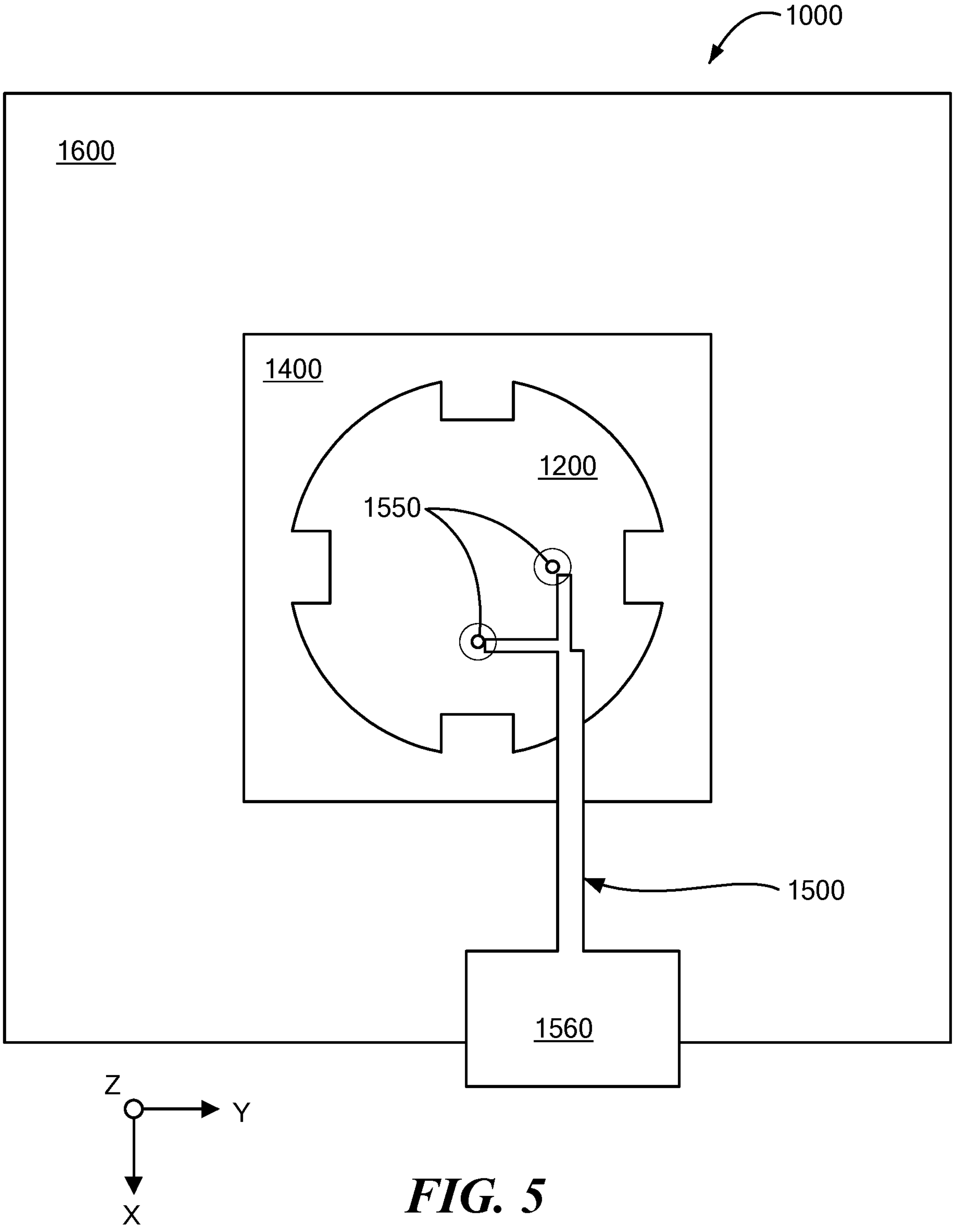
FIG. 5 depicts another plan view of the example design-1 antenna of FIG. 1 with an example feed network, in accordance with an embodiment.

Reference is now made to FIGS. 1-5 in combination, wherein: FIG. 1 depicts a plan view of an example design-1 antenna 1000; FIG. 2 depicts a rotated isometric view of the example design-1 antenna 1000 of FIG. 1; FIG. 3 depicts a plan view of the example design-1 antenna 1000 of FIG. 1 with example fabrication details presented; FIG. 4 depicts another plan view of the example design-1 antenna 1000 of FIG. 1 with other example fabrication details presented; and, FIG. 5 depicts another plan view of the example design-1 antenna 1000 of FIG. 1 with an example signal feed network 1500 having example signal probes 1550 depicted. The signal probes 1550 are also depicted in FIG. 2, where one of the two probes is a signal injection probe isolated from and passing through the patch 1200 via a coaxial feed, and the other of the two probes is electrically connected to the patch 1200. In an embodiment and as depicted in FIG. 4, a first 1551 of the two signal probes 1550 is disposed on an x-axis but not a y-axis of the patch 1200, and a second 1552 of the two signal probes 1550 is disposed on the y-axis but not the x-axis of the patch 1200.

In an embodiment, the antenna 1000 includes an electrically conductive patch 1200 disposed on a magnetodielectric, MD, substrate 1400 that is disposed on an electrically conductive ground plane 1600. The patch 1200 has a particular 2D plan view geometry that includes in-plane edge cutouts or voids 1220 and an in-plane internal cutout or void 1240 having an H-shape or an I-shape (herein referred to generally as an H-shape). In an embodiment, the material of the substrate 1400 in the regions of the voids 1220, 1240 may comprise a dielectric-only material, which by strategically arranging a void in the patch material, the electric and magnetic fields may be pushed on the edge of the substrate to effectively improve the fringing fields.

Example design specifications for the antenna 1000 include the following: the MD substrate 1400 having $\varepsilon$=6.3, $\mu$=1.8, tan $\delta$=0.004, tan $\mu$t=0.03; the antenna 1000 having Miniaturization Factor=11.34; the patch 1200 having an overall diameter D1=1.7 inches; the substrate 1400 having a thickness T1=7.52 mm (into the plane of FIG. 1), an x-dimension Sx1=49.96 mm, and a y-dimension Sy1=49.96 mm; the ground plane 1600 having an x-dimension Gx1=101.6 mm, and a y-dimension Gy1=101.6 mm; and the signal probe 1550 having a diameter Pd1=1.27 mm. Here, particular dimensions for the antenna 1000 and substrate thickness T1 are presented, which were used for analytically modeling the performance characteristics of the design-1 antenna 1000. And while particular dimensions are presented, it will be appreciated that these are for example purposes only, and may be modified depending on the desired antenna performance characteristics for a particular application.

With particular reference to FIG. 3, particular dimensions for the patch 1200, the cutout 1240 of the patch 1200, and the peripheral notches 1220 of the patch 1200, are presented. While particular dimensions are presented, it will be appreciated that these are for example purposes only, and may be modified depending on the desired antenna performance characteristics for a particular application. FIG. 3 also depicts particular locations for the two signal probes 1550 relative to the cutout 1240 and notched 1220 periphery of the patch 1200.

In an embodiment, the H-shaped cutout 1240 has two parallel legs 1242, 1244 and a bridge 1246 perpendicular to the two legs 1242, 1244. In an embodiment, each of the two legs 1242, 1244 have an overall length HL, a width of HW, and a tail having a length HT. In an embodiment, the bridge 1246 of the H-shaped cutout 1240 has a length HB. In an embodiment, the H-shaped cutout 1240 has mirror-image symmetry in two planes orthogonal to a plan view plane of the patch 1200, such that a width of the bridge 1246 is equal to (HL minus (2 times HT)), and such that an overall width of the H-shaped cutout 1240 is equal to (HB plus (2 times HW)). In an embodiment, the legs 1242, 1244 of the H-shaped cutout 1240 are disposed at an angle $\alpha$ relative to y-axis of a central x-y-z orthogonal reference frame of the patch 1200, and the H-shaped cutout 1240 is radially offset from a central z-axis 1201 of the patch 1200, the central z-axis 1201 extending perpendicular to a plan view of the patch 1200 (see FIG. 3 for example).

In an embodiment, the overall diameter D1 of the patch 1200 has a plurality of edge cutouts (peripheral notches) 1220, with each cutout having a width NW and a length NL. In an embodiment, the patch 1200 has four edge cutouts 1220 that are uniformly distributed around a perimeter of the patch 1200.

In an embodiment, the two signal probes 1550 are respectfully located at x and y dimensions PX and PY relative to the central z-axis 1201 of the patch 1200.

In a particular embodiment that was used for analytical modeling, HL=15 mm, HW=2.5 mm, HT=5 mm, HB=5 mm, NW=10 mm, NL=5 mm, PX=8 mm, PY=8 mm, and $\alpha$=40 degrees.

A particular location and orientation of the H-shaped cutout 1240 relative to the central z-axis 1201 of the patch 1200 will now be described with reference to FIG. 4. As depicted, four edge cutouts 1220 are uniformly distributed around a perimeter of the patch 1200 at 90-degree intervals, are located such that the x-axis bifurcates two opposing ones of the cutouts 1220 and the y-axis bifurcates another two opposing ones of the cutouts. In an embodiment, an inner edge of one of a cutout 1220 is located at a distance of X1 from the central z-axis 1201 along the x-axis. In an embodiment, the H-shaped cutout 1240 has an outer profile with defined corner points P1, P2, P3, and P4, of the "H" shape, where each of the corner points P1-P4 are located at defined x,y coordinates that establish a particular orientation of the H-shape cutout 1240 relative to the z-axis in the x-y plane of an x-y-z orthogonal coordinate system. In an embodiment, the distance X1=19.1 mm, P1 has x,y coordinates of (−8.6 mm, −3.2 mm), P2 has x,y coordinates of (2.9 mm, −12.8 mm), P3 has x,y coordinates of (9.2 mm, −5.2 mm), and P4 has x,y coordinates of (−2.2 mm, 4.4 mm). While particular coordinates for P1-P4 are presented in FIG. 4, it will be appreciated that these are for example purposes only, and may be modified depending on the desired antenna performance characteristics for a particular application.

FIG. 5 depicts the example feed network 1500 disposed under the ground plane 1600, and is configured for providing a dual-feed via the signal probes 1550, where the feed network 1500 is suitable for communication over GPS L5 and GPS L2 bands for example. In an embodiment, the feed network 1500 is connected to other system components (not shown) via a connector 1560.

In an embodiment, other specifications for the example design-1 antenna 1000 of FIG. 1 for dual band performance include: a dual frequency range at −10 dBi of 1.164-1.189 GHZ, and 1.215-1.239 GHz; a gain of 3 dBi; an axial ratio, AR, bandwidth of 3 dBi; an efficiency of greater than 50%; and, a polarization of RHCP (right-hand circular polarization).

While particular specifications are defined, it will be appreciated that these are for example only, and may be modified depending on the desired antenna performance characteristics for a particular application.

Figure 6:
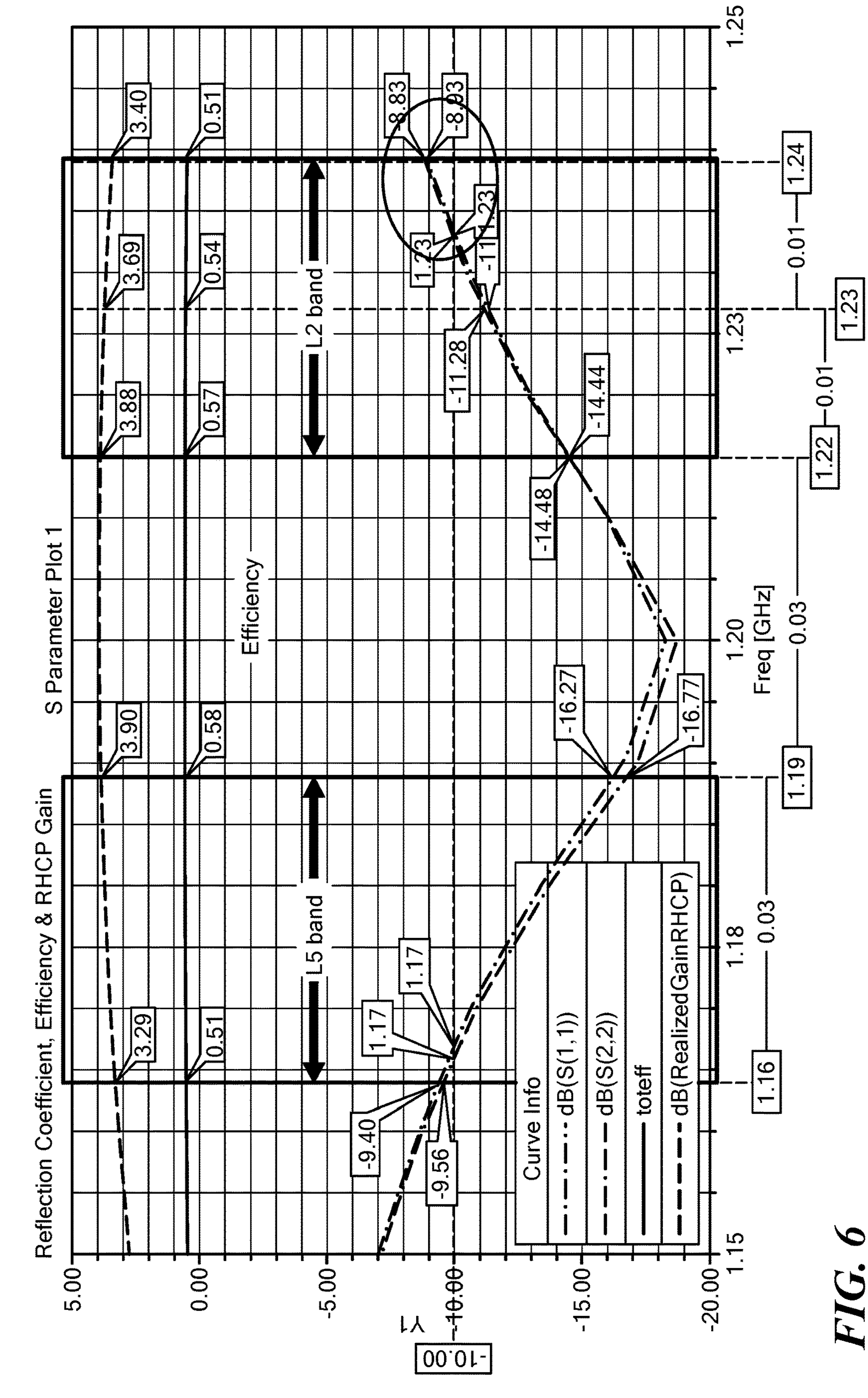
FIG. 6 depicts performance characteristics of the example design-1 antenna of FIG. 1, in accordance with an embodiment.

FIG. 6 depicts performance characteristics of the example design-1 antenna 1000 of FIG. 1. Here, the reflection coefficient, efficiency, and RHCP gain of antenna 1000, versus frequency, is graphically illustrated.

Figure 7:
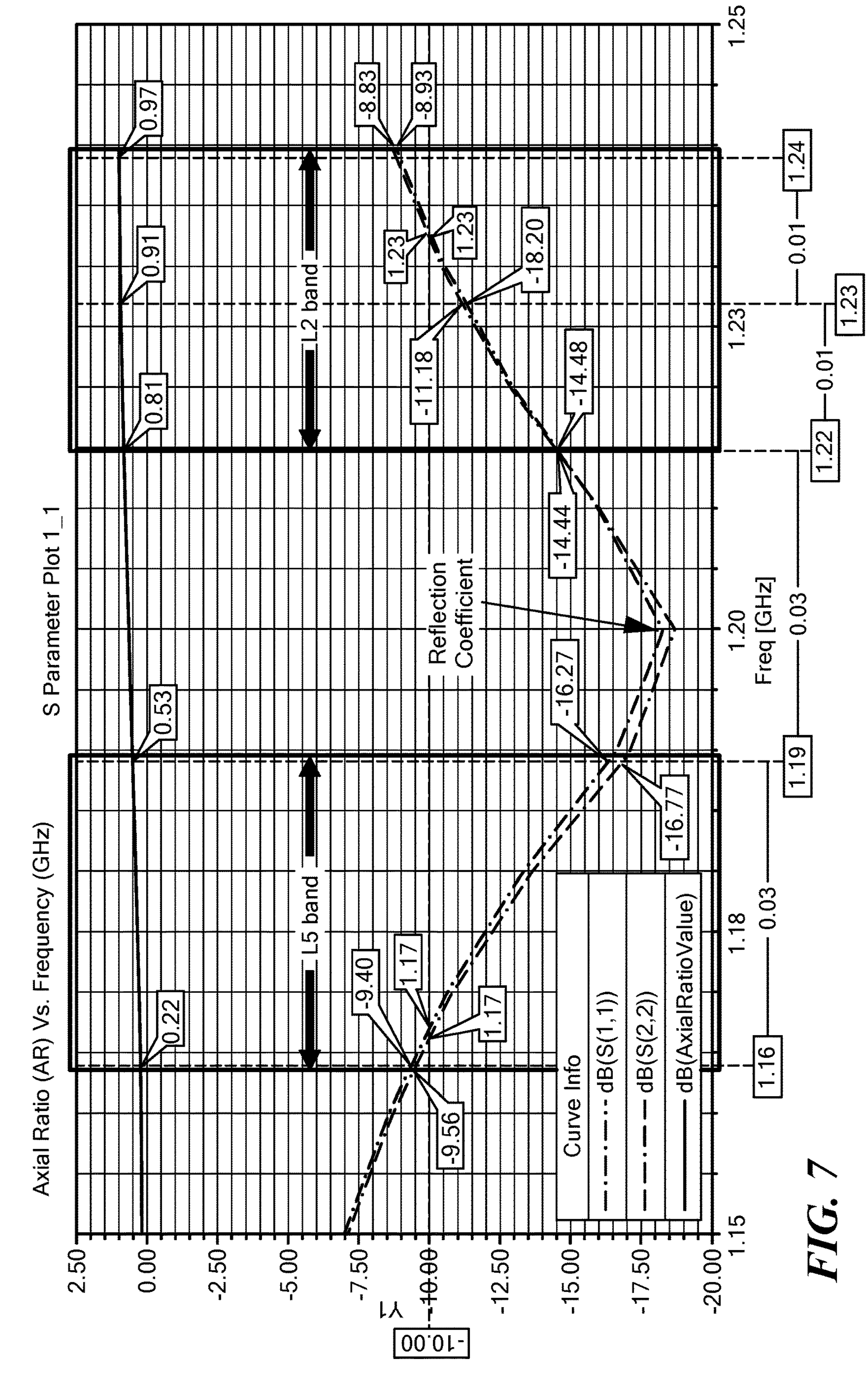
FIG. 7 depicts other performance characteristics of the example design-1 antenna of FIG. 1, in accordance with an embodiment.

FIG. 7 depicts other performance characteristics of the example design-1 antenna 1000 of FIG. 1. Here, the axial ratio (AR) of antenna 1000, versus frequency, is graphically illustrated.

Figure 8:
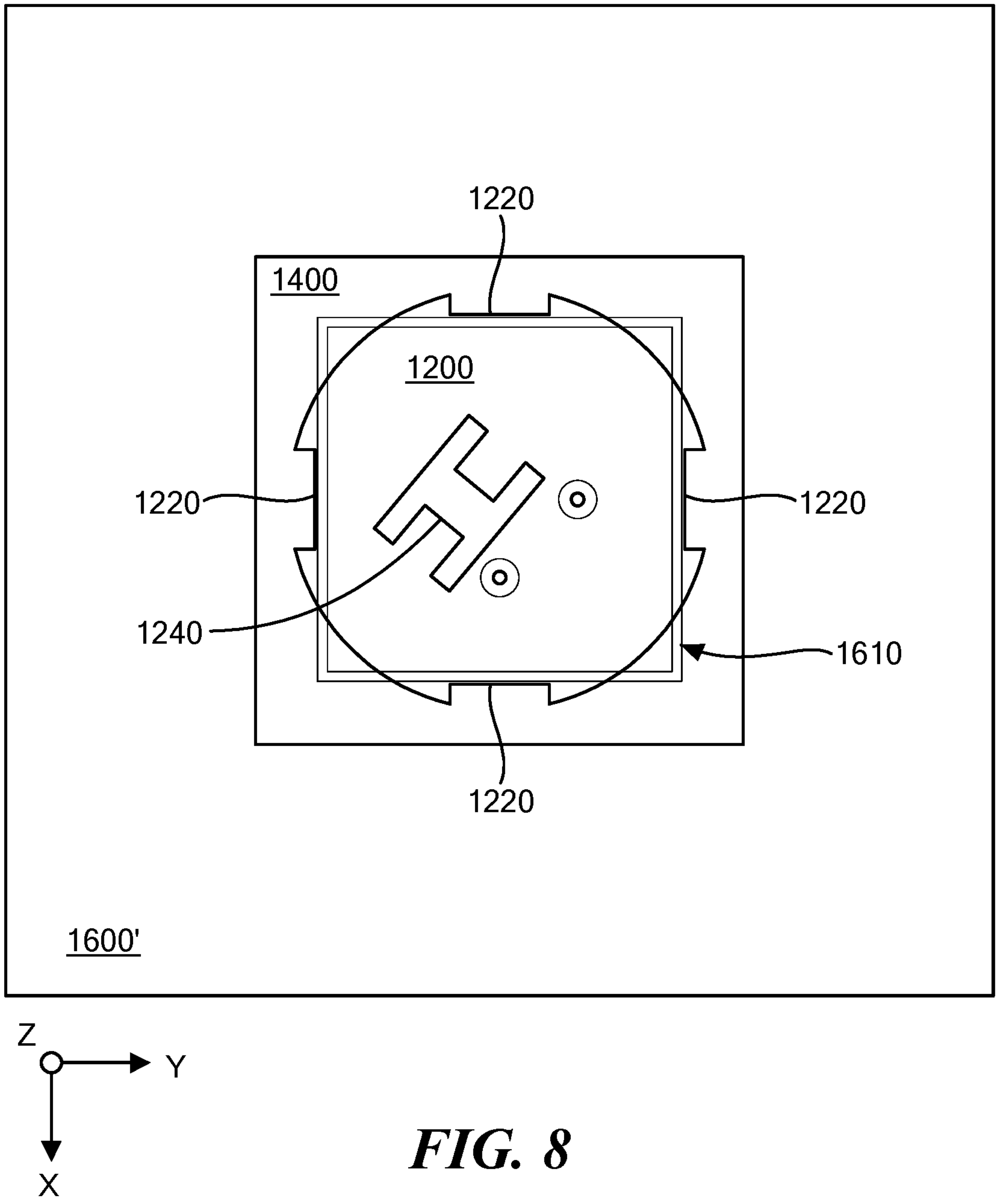
FIG. 8 depicts a plan view of an example design-2 antenna comparable to that of FIG. 1, in accordance with an embodiment.
Figure 9:
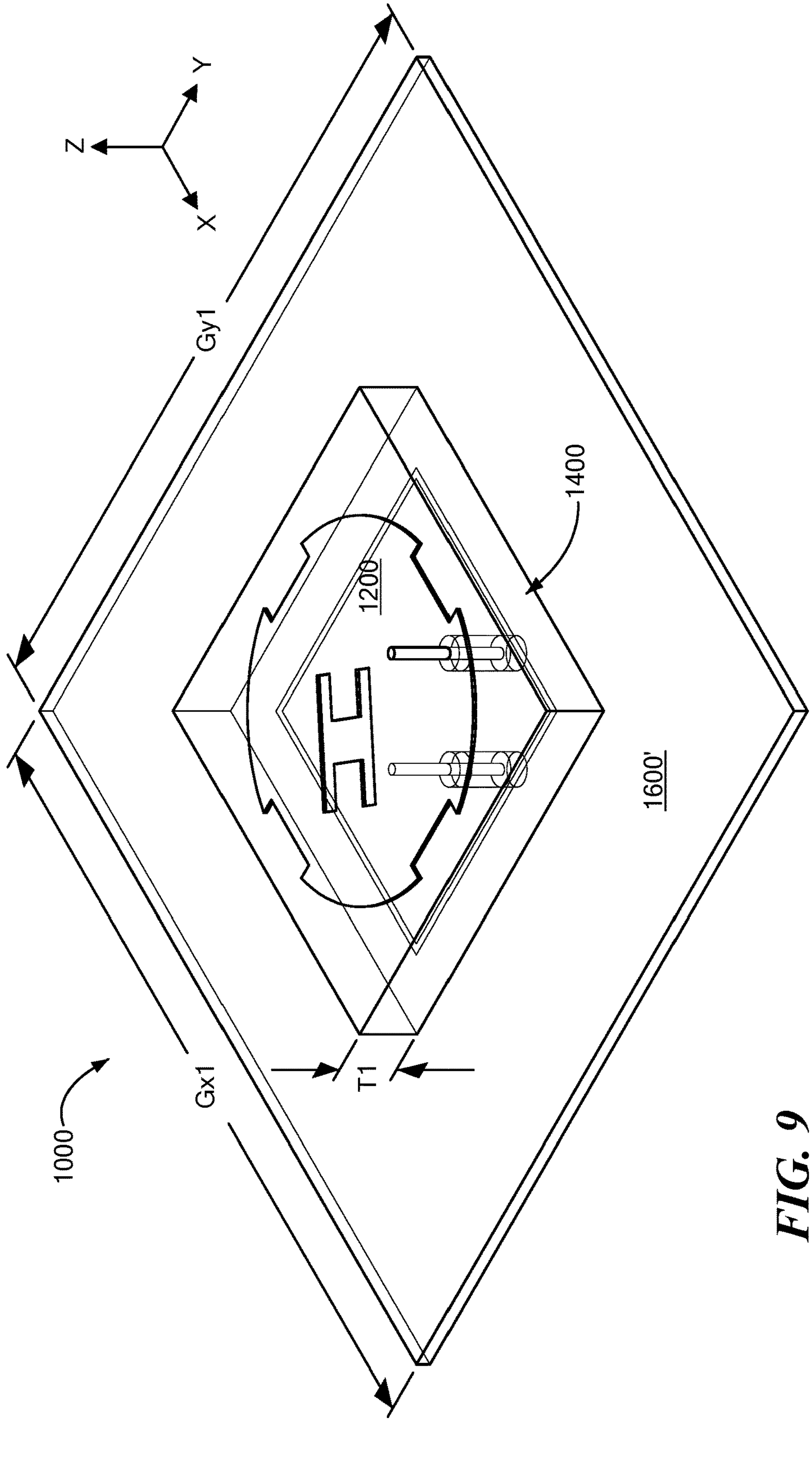
FIG. 9 depicts a rotated isometric view of the example design-2 antenna of FIG. 8, in accordance with an embodiment.
Figure 10:
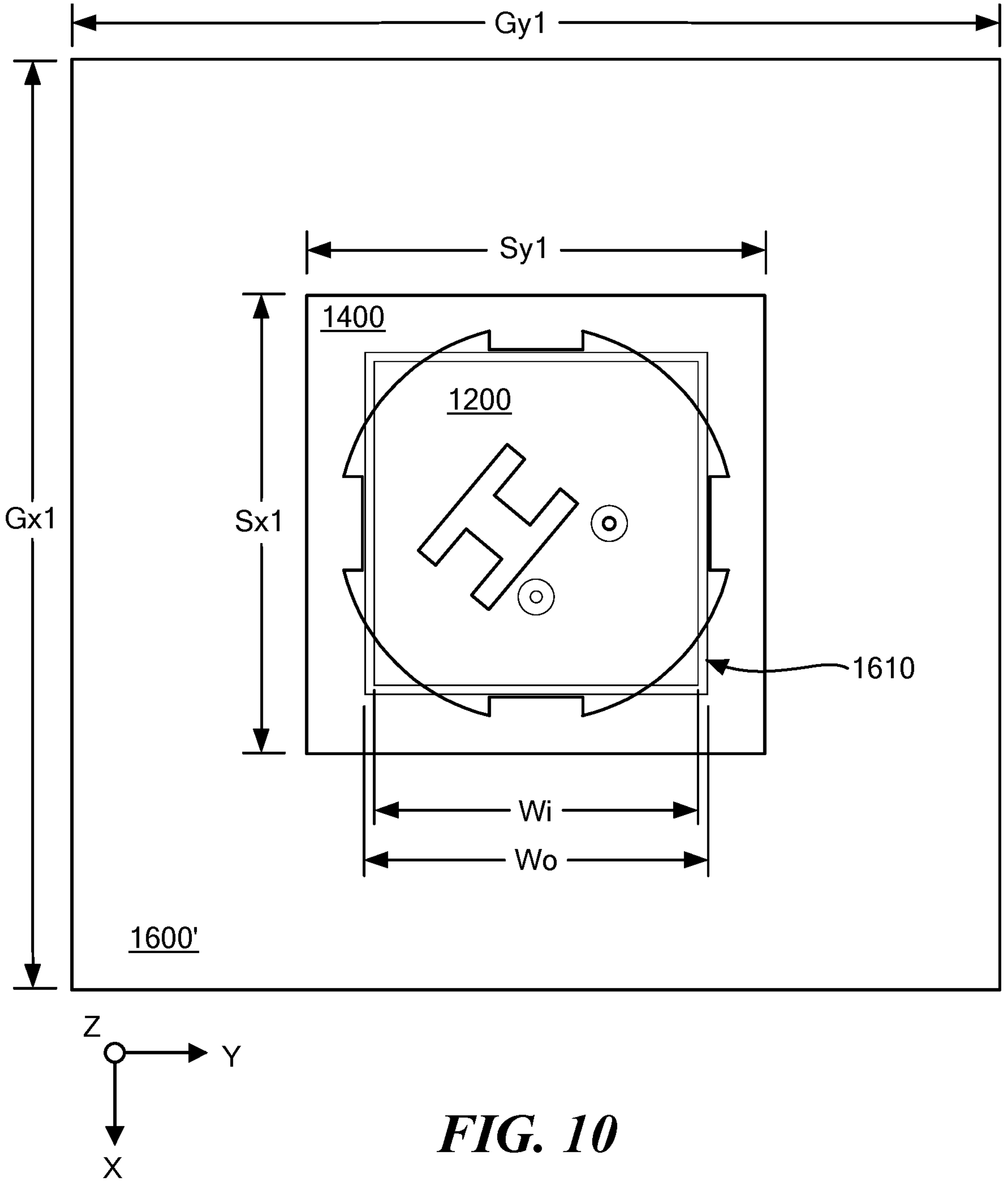
FIG. 10 depicts a plan view of the example design-2 antenna of FIG. 8 with example fabrication details, in accordance with an embodiment.

Reference is now made to FIGS. 8-10 in combination, where like elements are numbered alike, and wherein: FIG. 8 depicts a plan view of an example design-2 antenna 2000; FIG. 9 depicts a rotated isometric view of the example design-2 antenna 2000 of FIG. 8; and, FIG. 10 depicts a plan view of the example design-2 antenna 2000 of FIG. 8 with example fabrication details illustrated.

The design-2 antenna 2000 differs from the design-1 antenna 1000 by the introduction of an etched-out ring 1610 on a ground plane 1600', which serves to electromagnetically shrink the ground plane 1600 of antenna 1000 and enhance the performance of the antenna 2000 by directing more EM energy into the substrate 1400. In an embodiment, the ground plane 1600' of antenna 2000 is completely absent of material of the ground plane 1600' in the region of the etched-out ring 1610.

Example design specifications for the antenna 2000 are identical to those of antenna 1000, and while not all specifically denoted in the associated figures, are at least implicitly disclosed by use of like reference numerals, include the following: the MD substrate 1400 having $\varepsilon=6.3$, $\tan\delta=0.004$, $\tan\mu=0.03$; the antenna 2000 having Miniaturization Factor=11.34; the patch 1200 having an overall diameter D1=1.7 inches; the substrate 1400 having a thickness T1=7.52 mm (into the plane of FIG. 8), an x-dimension Sx1=49.96 mm, and a y-dimension Sy1=49.96 mm; the ground plane 1600' having an x-dimension Gx1=101.6 mm, and a y-dimension Gy1=101.6 mm; and the signal probe 1550 having a diameter Pd1=1.27 mm. Other design specifications of antenna 2000 are also identical to those of antenna 1000, such as: HL=15 mm, HW=2.5 mm, HT=5 mm, HB=5 mm, NW=10 mm, NL=5 mm, PX=8 mm, PY=8 mm, and $\alpha$=40 degrees. In addition, the location and orientation of the H-shaped cutout 1240 of antenna 2000 relative to the central z-axis 1201 of the patch 1200 is identical to that of antenna 1000. For example, four edge cutouts 1220 are uniformly distributed around a perimeter of the patch 1200 at 90-degree intervals, are located such that the x-axis bifurcates two opposing ones of the cutouts 1220 and the y-axis bifurcates another two opposing ones of the cutouts. In an embodiment, an inner edge of one of a cutout 1220 is located at a distance of X1 from the central z-axis 1201 along the x-axis. In an embodiment, the H-shaped cutout 1240 has an outer profile with defined corner points P1, P2, P3, and P4, of the "H" shape, where each of the corner points P1-P4 are located at defined x,y coordinates that establish a particular orientation of the H-shape cutout 1240 relative to the z-axis in the x-y plane of an x-y-z orthogonal coordinate system. In an embodiment, the distance X1=19.1 mm, P1 has x,y coordinates of (−8.6 mm, −3.2 mm), P2 has x,y coordinates of (2.9 mm, −12.8 mm), P3 has x,y coordinates of (9.2 mm, −5.2 mm), and P4 has x,y coordinates of (−2.2 mm, 4.4 mm).

Reference is now particularly made to FIG. 10, which depicts antenna 2000 with the patch 1200 and the substrate 1400 identical to that of antenna 1000, and with a ground plane 1600' substantially identical to that of antenna 1000 but with the etched-out ring 1610 on the ground plane 1600'. Here, particular dimensions for the etched-out ring 1610 relative to the patch 1400 are presented, where in an embodiment, the rectangular etched-out ring 1610 has an inner cutout dimension Wi, where for example Wi=36 mm, and an outer cutout dimension of Wo, where for example Wo=38 mm, or alternatively has an annular cutout dimension of Wa=1 mm. While particular dimensions are presented regarding antenna 2000, it will be appreciated that these are for example purposes only, and may be modified depending on the desired antenna performance characteristics for a particular application.

Figure 11:
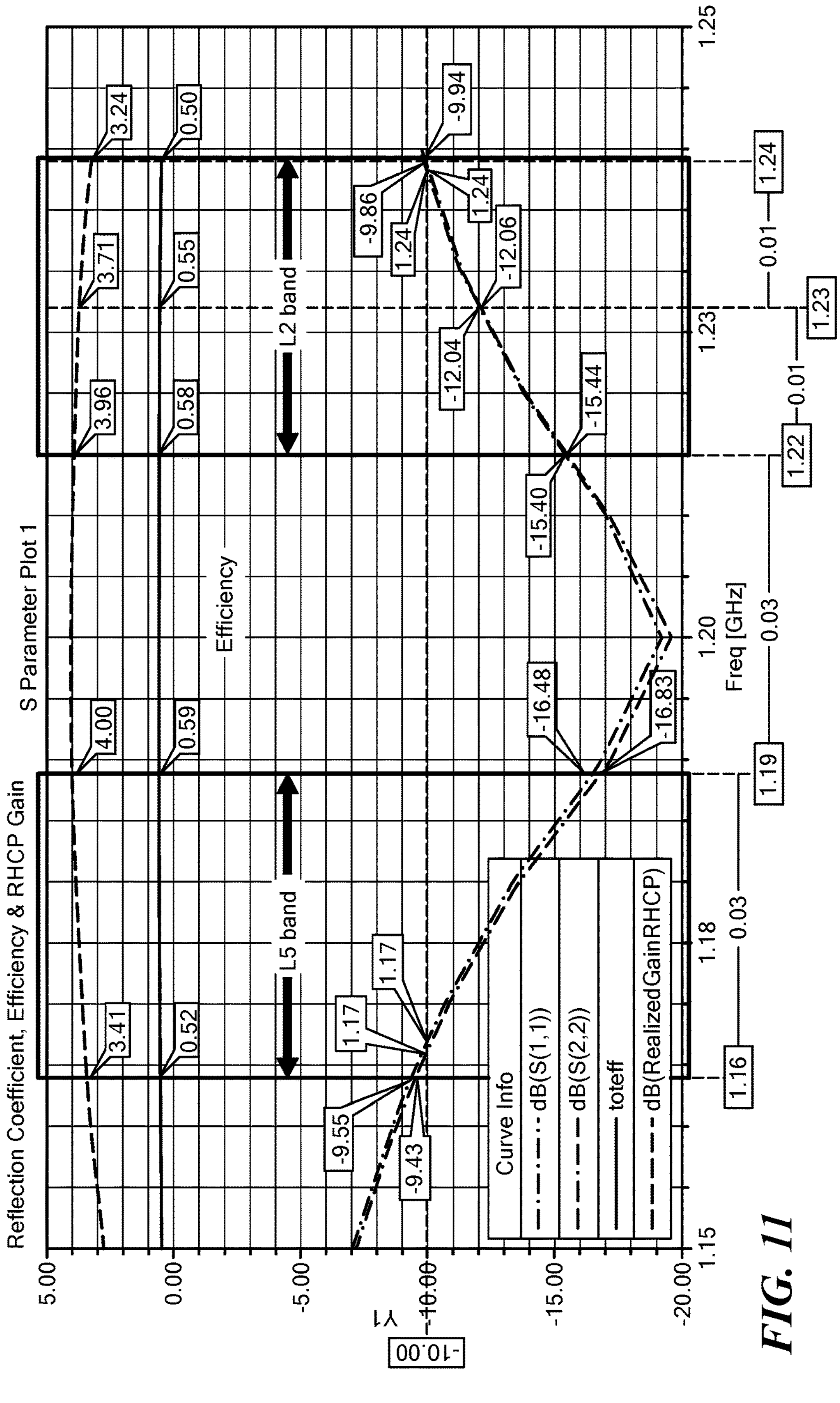
FIG. 11 depicts performance characteristics of the example design-2 antenna of FIG. 8, in accordance with an embodiment.
Figure 12:
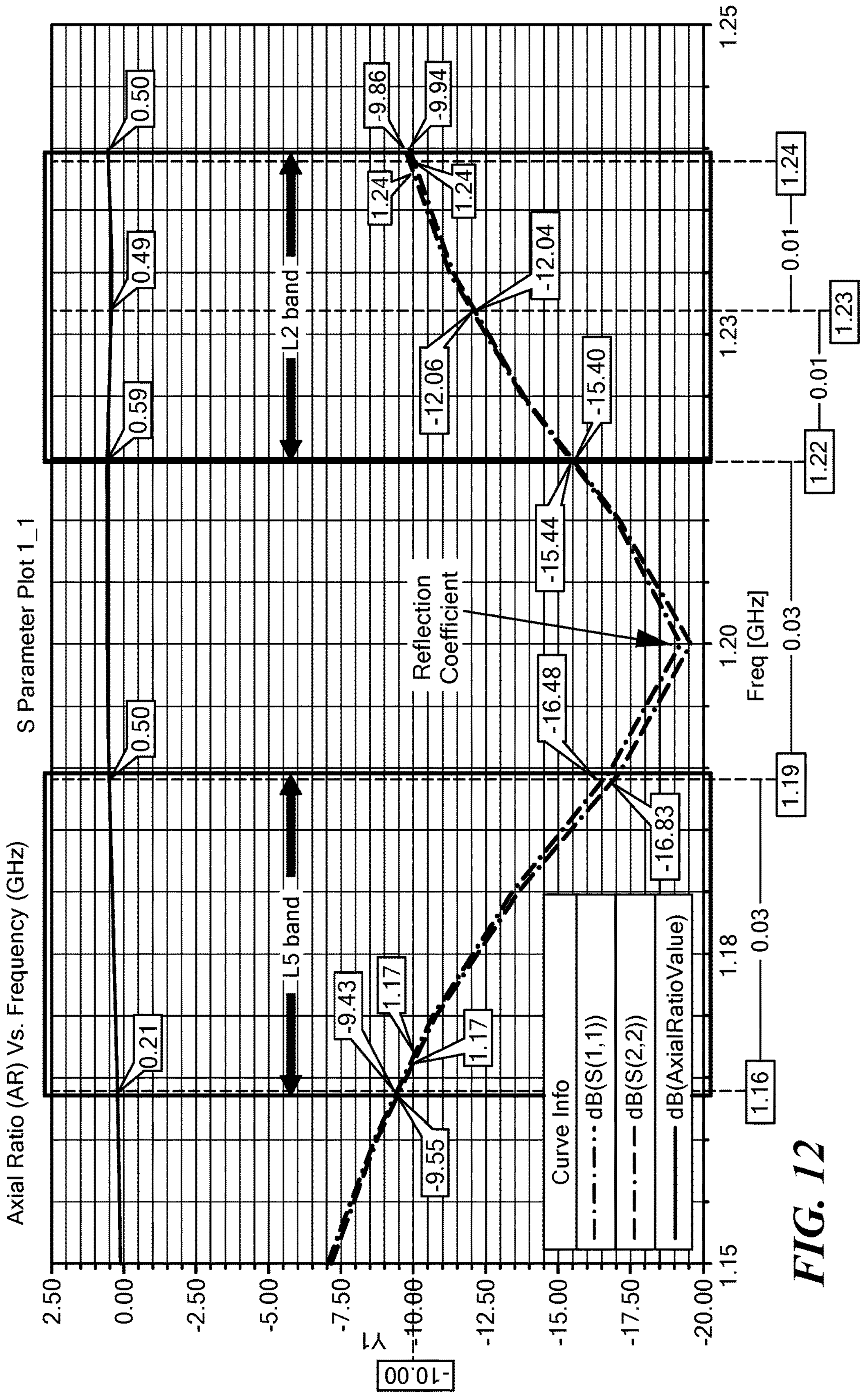
FIG. 12 depicts other performance characteristics of the example design-2 antenna of FIG. 8, in accordance with an embodiment.

FIGS. 11 and 12 depict performance parameters and characteristics of the example design-2 antenna 2000, where the parameters are similar to those of example design-1 antenna 1000 as depicted in FIGS. 6 and 7. In comparing the performance characteristics of FIGS. 11 and 12 with those of FIGS. 6 and 7, it can be seen that enhanced performance is achievable at the upper end of the L2 band with inclusion of the etched-out ring 1610 in the ground plane 1600'.

Figure 13:
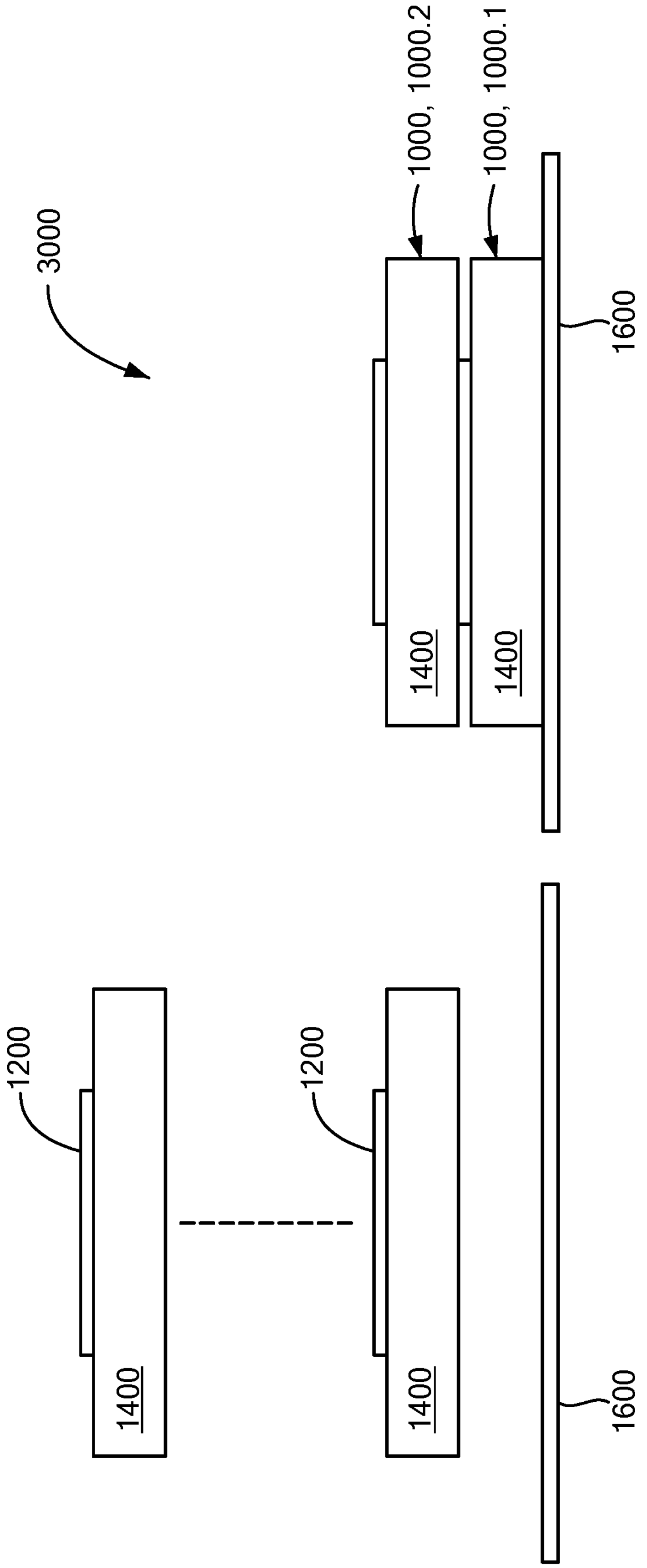
FIG. 13 depicts side views of an expanded assembly and a final assembly of at least two stacked antennas on a ground plane, in accordance with an embodiment.

Reference is now made to FIG. 13, which depicts side views of an expanded assembly and a final assembly 3000 of at least two stacked antennas 1000.1, 1000.2 (also generally referred to by reference numeral 1000) on a ground plane 1600. Here, each stacked antenna 1000 includes a patch 1200 disposed on a magnetodielectric substrate 1400 as disclosed herein, which in combination are disposed on the ground plane 1600. While only two stacked antennas are depicted, it will be appreciated that more than two antennas may be combined. It is contemplated that such an arrangement may contribute to different frequency bands of operation. While FIG. 13 depicts antenna 1000 on ground plane 1600, it will be appreciated that a similar arrangement may be constructed using antenna 2000 on ground plan 1600'.

Figure 14:
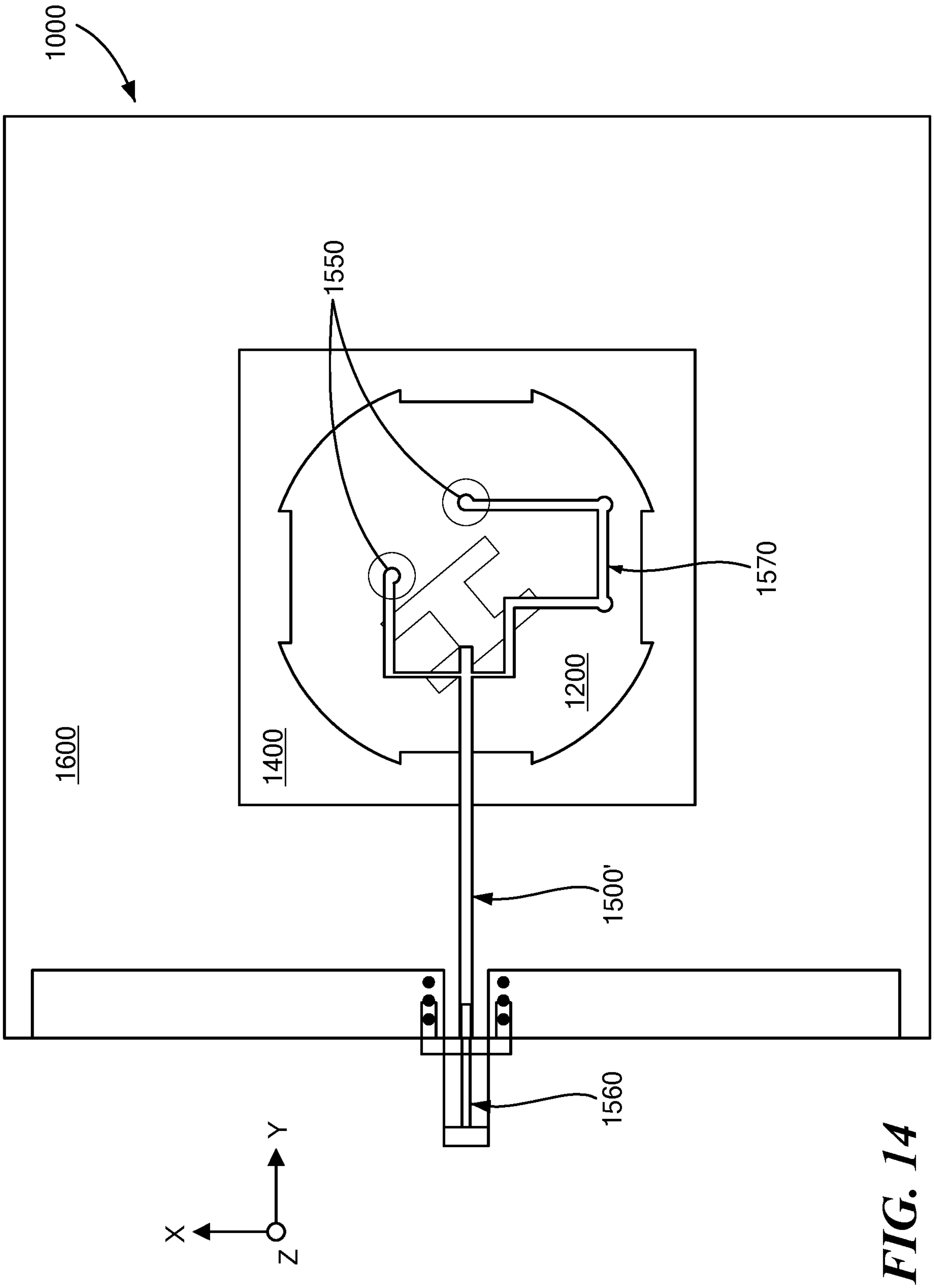
FIG. 14 depicts a bottom-up transparent plan view of an example feed network in combination with the example design-1 antenna of FIG. 1, in accordance with an embodiment.
Figure 15:
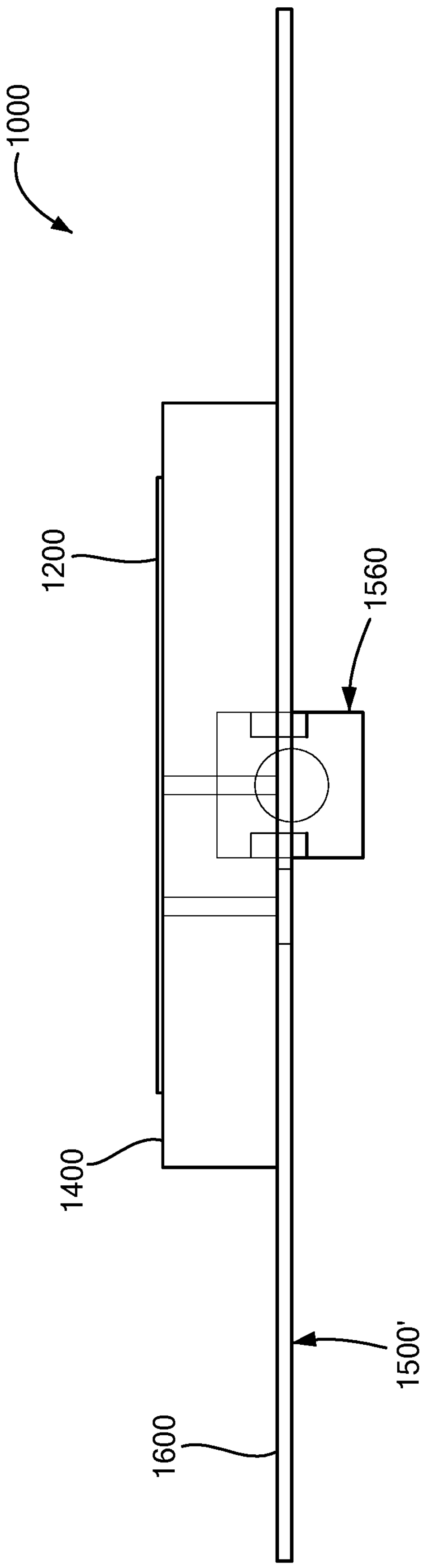
FIG. 15 depicts an end view of the example feed network and design-1 antenna of FIG. 14, in accordance with an embodiment.

Reference is now made to FIGS. 14 and 15, where FIG. 14 depicts a bottom-up plan view, and FIG. 15 depicts an end view, of an example optional feed network 1500' connected to an antenna 1000 as disclosed herein, where the location of the feed network 1500' may change depending on the particular application. As such, the location of the feed network 1500' depicted in FIGS. 14 and 15 is for example purposes only, and is not intended to be limiting in any way to the invention claimed herein. In an embodiment, the feed network 1500' includes power divider circuitry 1570 connected between a signal port connector 1560 and the two signal probes 1550.

With collective reference to FIGS. 1-15, it will be appreciated that various aspects of an embodiment are disclosed herein, which are in accordance with, but not limited to, at least the following aspects and/or combinations of aspects.

Aspect 1: A dual band antenna 1000, 2000, comprising: a substrate 1400 comprising a magnetodielectric material; an electrically conductive patch 1200 disposed on the substrate; wherein the patch comprises at least one in-plane cutout 1240 having an H-shape or an I-shape, as observed in a plan view of the patch.

Aspect 2: The dual band antenna of Aspect 1, wherein the at least one cutout 1240 is disposed at an oblique angle relative to a central x-y-z orthogonal reference frame of the patch.

Aspect 3: The dual band antenna of any one of Aspects 1 to 2, wherein the substrate is a single layer of the magnetodielectric material.

Aspect 4: The dual band antenna of any one of Aspects 1 to 3, wherein a combination of the magnetodielectric substrate and the patch provides a first layer 1000.1 of the dual band antenna, and further wherein a second layer 1000.2 of the combination is disposed on the first layer to form a multi-layer dual band antenna 3000.

Aspect 5: The dual band antenna of any one of Aspects 1 to 4, wherein the at least one cutout is disposed inside of an outer periphery of the patch.

Aspect 6: The dual band antenna of any one of Aspects 1 to 5, wherein the H-shape or I-shape of the at least one cutout has mirror-image symmetry in two planes orthogonal to a plan view plane of the patch.

Aspect 7: The dual band antenna of any one of Aspects 1 to 6, wherein an outer periphery of the patch is smaller than and disposed within an outer periphery of the substrate. Alternatively, an outer periphery of the patch is the same size as the outer periphery of the magnetodielectric substrate. The size of the patch relative to the magnetodielectric substrate is based on a desired operating frequency.

Aspect 8: The dual band antenna of any one of Aspects 1 to 7, wherein the outer periphery of the substrate has a plan view profile that is rectangular, or circular.

Aspect 9: The dual band antenna of any one of Aspects 1 to 8, wherein the outer periphery of the patch has a plan view profile that is at least partially circular.

Aspect 10: The dual band antenna of any one of Aspects 1 to 9, wherein the at least one cutout is radially offset from a central z-axis of the patch, the central z-axis extending perpendicular to a plan view of the patch.

Aspect 11: The dual band antenna of any one of Aspects 1 to 10, wherein the at least one cutout has two elongated legs and a bridge leg that conjoins the two elongated legs, the two elongated legs being oriented at a non-zero-degree angle and a non-ninety-degree angle relative to both a centrally disposed x-axis and a centrally disposed y-axis of the patch, as observed in a plan view of the patch. By orienting the elongated legs (slots) of the cutout at an oblique angle, two orthogonal EM modes may be generated.

Aspect 12: The dual band antenna of Aspect 11, wherein the two elongated legs are each oriented at a forty-five-degree angle relative to both the x-axis and the y-axis of the patch.

Aspect 13: The dual band antenna of any one of Aspects 11 to 12, wherein the bridge leg is oriented orthogonal to each of the two elongated legs.

Aspect 14: The dual band antenna of any one of Aspects 11 to 13, wherein the bridge leg is disposed equidistant from each end of each of the two elongated legs.

Aspect 15: The dual band antenna of any one of Aspects 1 to 14, wherein the outer periphery of the patch comprises one or more notches.

Aspect 16: The dual band antenna of Aspect 15, wherein the one or more notches, such as four notches for example, are symmetrically disposed on the outer periphery of the patch.

Aspect 17: The dual band antenna of Aspect 15, wherein the one or more notches, such as only two closest adjacent ones of the four notches illustrated for example, are asymmetrically disposed on the outer periphery of the patch.

Aspect 18: The dual band antenna of Aspect 15, wherein the one or more notches comprise at least one pair of notches that are diametrically opposed from each other.

Aspect 19: The dual band antenna of Aspect 15, wherein the one or more notches comprise at least two pairs of notches that are each respectively diametrically opposed from each other.

Aspect 20: The dual band antenna of Aspect 19, wherein as observed in a plan view of the patch relative to a central z-axis of the patch, a first pair of the at least two pairs of notches are disposed on an x-axis of the patch, and a second pair of the at least two pairs of notches are disposed on a y-axis of the patch.

Aspect 21: The dual band antenna of any one of Aspects 15 to 20, wherein the one or more notches are disposed equidistantly around the outer periphery of the patch.

Aspect 22: The dual band antenna of any one of Aspects 15 to 21, wherein the one or more notches have identical profiles.

Aspect 23: The dual band antenna of any one of Aspects 15 to 22, wherein the one or more notches each have a profile that is partially rectangular.

Aspect 24: The dual band antenna of any one of Aspects 1 to 23, further comprising two signal probes 1550.

Aspect 25: The dual band antenna of Aspect 24, wherein each one of the two signal probes is oriented parallel to the central z-axis of the patch.

Aspect 26: The dual band antenna of any one of Aspects 24 to 25, wherein as observed in a plan view of the patch relative to a central z-axis of the patch, a first 1551 of the two signal probes 1550 is disposed on an x-axis but not a y-axis of the patch, and a second 1552 of the two signal probes 1550 is disposed on the y-axis but not the x-axis of the patch.

Aspect 27: The dual band antenna of any one of Aspects 24 to 26, further comprising an electrical ground reference 1600, wherein the substrate is disposed on the electrical ground reference.

Aspect 28: The dual band antenna of Aspect 27, further comprising a signal feed network 1500 disposed in signal communication with the patch.

Aspect 29: The dual band antenna of Aspect 28, wherein the signal feed network is disposed below the substrate.

Aspect 30: The dual band antenna of any one of Aspects 28 to 29, wherein the signal feed network is disposed above the electrical ground reference.

Aspect 31: The dual band antenna of any one of Aspects 28 to 29, wherein the signal feed network is disposed below the electrical ground reference.

Aspect 32: The dual band antenna of any one of Aspects 28 to 31, wherein the signal feed network includes power divider circuitry 1570 electrically connected with and between a signal port connector 1560 and the two signal probes 1550.

Aspect 33: The dual band antenna of any one of Aspects 27 to 32, wherein an outer periphery of the substrate is smaller than and disposed within an outer periphery of the electrical ground reference.

Aspect 34: The dual band antenna of any one of Aspects 27 to 33, wherein the electrical ground reference comprises a void 1610 of ground material proximate the substrate and inboard of an outer periphery of the substrate. By arranging a square etched-out void 1610 in the ground material under the substrate, an improvement in the impedance bandwidth, gain, and efficiency, may be realized.

Aspect 35: The dual band antenna of Aspect 34, wherein the void of ground material is at least partially inboard of the outer periphery of the patch, as observed in a plan view of the patch.

Aspect 36: The dual band antenna of any one of Aspects 34 to 35, wherein the void of ground material is at least partially outboard of the outer periphery of the patch, as observed in a plan view of the patch.

Aspect 37: The dual band antenna of any one of Aspects 34 to 36, wherein the void of ground material is both at least partially outboard and at least partially inboard of the outer periphery of the patch, as observed in a plan view of the patch.

Aspect 38: The dual band antenna of any one of Aspects 34 to 37, wherein the void of ground material is in the form of a rectangle.

Aspect 39: The dual band antenna of any one of Aspects 1 to 38, wherein the dual band antenna is operational over at least two frequency bands.

Aspect 40: The dual band antenna of Aspect 39, wherein the dual band antenna is operational to discriminate frequencies between individual ones of the at least two frequency bands.

Aspect 41: The dual band antenna of any one of Aspects 39 to 40, wherein a first of the at least two frequency bands is the L5 band.

Aspect 42: The dual band antenna of Aspect 41, wherein a second of the at least two frequency bands is the L2 band.

Aspect 43: The dual band antenna of Aspect 39, wherein the at least two frequencies are operational within a nominal frequency range from 1.17 GHz to 1.23 GHz.

Aspect 44: The dual band antenna of any one of Aspects 1 to 43, wherein the dual band antenna is operational with a gain equal to or greater than 3 dBi at each respective operational band.

Aspect 45: The dual band antenna of any one of Aspects 1 to 44, wherein the dual band antenna is operational with an axial ratio equal to or less than 3 dB, at +/−30-degrees from each radiation boresight of the dual band antenna.

Aspect 46: The dual band antenna of any one of Aspects 1 to 45, wherein the dual band antenna is operational with right-hand-circular-polarization, or left-hand-circular polarization, by alternating the phases in each signal probe.

Aspect 47: The dual band antenna of any one of Aspects 1 to 46, wherein the dual band antenna is operational with an efficiency of equal to or greater than 51%.

Aspect 48: The dual band antenna of Aspect 47, wherein the dual band antenna is operational at a broad axial ratio bandwidth at 3 dBi of equal to or greater than 10 MHz, alternatively equal to or greater than 50 MHz, further alternatively equal to or greater than 100 MHz.

As used herein, the phrase "equal to about" is intended to account for manufacturing tolerances and/or insubstantial deviations from a nominal value that do not detract from a purpose disclosed herein and falling within a scope of the appended claims.

While certain combinations of individual features have been described and illustrated herein, it will be appreciated that these certain combinations of features are for illustration purposes only and that any combination of any of such individual features may be employed in accordance with an embodiment, whether or not such combination is explicitly illustrated, and consistent with the disclosure herein. Any and all such combinations of features as disclosed herein are contemplated herein, are considered to be within the understanding of one skilled in the art when considering the application as a whole, and are considered to be within the scope of the invention disclosed herein, as long as they fall within the scope of the invention defined by the appended claims, in a manner that would be understood by one skilled in the art.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. When an element such as a layer, film, region, substrate, or other described feature is referred to as being "on" or in "engagement with" another element, it can be directly on or engaged with the other element, or intervening elements may also be present. In contrast, when an element is referred to as being "directly on" or "directly engaged with" another element, there are no intervening elements present. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The use of the terms "top", "bottom", "up", "down", "left", "right", "front", "back", etc., or any reference to orientation, do not denote a limitation of structure, as the structure may be viewed from more than one orientation, but rather denote a relative structural relationship between one or more of the associated features as disclosed herein. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

The invention claimed is:

1. A dual band antenna, configured to operate according to a first frequency band and a second frequency band different from the first frequency band, the dual band antenna comprising:

a substrate comprising a magnetodielectric material;

an electrically conductive patch disposed on the substrate;

wherein the patch comprises at least one in-plane cutout having an H-shape or an I-shape, as observed in a plan view of the patch, wherein the at least one in-plane cutout is disposed inside of the outer periphery of the patch, and wherein the outer periphery of the patch comprises one or more notches.

2. The dual band antenna of claim 1, wherein:

the at least one cutout is disposed at an oblique angle relative to a central x-y-z orthogonal reference frame of the patch.

3. The dual band antenna of claim 1, wherein:

the substrate is a single layer of the magnetodielectric material.

4. The dual band antenna of claim 1, wherein a combination of the substrate and the patch provides a first layer of the dual band antenna, and further wherein:

a second layer of the combination is disposed on the first layer to form a multi-layer dual band antenna.

5. The dual band antenna of claim 1, wherein:

the H-shape or I-shape of the at least one cutout has mirror-image symmetry in two planes orthogonal to a plan view plane of the patch.

6. The dual band antenna of claim 1, wherein:

the outer periphery of the patch is smaller than and disposed within an outer periphery of the substrate, a patch size of the patch being a matching a size of the substrate based on the design frequency.

7. The dual band antenna of claim 1, wherein:

the outer periphery of the substrate has a plan view profile that is rectangular, or circular.

8. The dual band antenna of claim 1, wherein:

the outer periphery of the patch has a plan view profile that is at least partially circular.

9. The dual band antenna of claim 1, wherein:

the at least one cutout is radially offset from a central z-axis of the patch, the central z-axis extending perpendicular to a plan view of the patch.

10. The dual band antenna of claim 1, wherein:

the at least one cutout has two elongated legs and a bridge leg that conjoins the two elongated legs, the two elongated legs being oriented at a non-zero-degree angle and a non-ninety-degree angle relative to both a centrally disposed x-axis and a centrally disposed y-axis of the patch, as observed in a plan view of the patch.

11. The dual band antenna of claim 10, wherein:

the two elongated legs are each oriented at a forty-five-degree angle relative to both the x-axis and the y-axis of the patch.

12. The dual band antenna of claim 10, wherein:

the bridge leg is oriented orthogonal to each of the two elongated legs.

13. The dual band antenna of claim 10, wherein:

the bridge leg is disposed equidistant from each end of each of the two elongated legs.

14. The dual band antenna of claim 1, further comprising:

two signal probes, wherein each one of the two signal probes is oriented parallel to the central z-axis of the patch.

15. The dual band antenna of claim 14, further comprising:

an electrical ground reference, wherein the substrate is disposed on the electrical ground reference.

16. The dual band antenna of any one of claim 15, further comprising:

a signal feed network disposed in signal communication with the patch;

wherein the signal feed network includes power divider circuitry electrically connected with and between a signal port connector and the two signal probes.

17. The dual band antenna of claim 1, wherein:

the dual band antenna is operational over at least two frequency bands, and is operational with right-hand-circular-polarization or left-hand-circular-polarization.

18. The dual band antenna of claim 1, wherein:

the dual band antenna is operational at a broad axial ratio bandwidth at 3 dB of equal to or greater than 100 MHz.

19. The dual band antenna of claim 1, wherein the one or more notches includes a plurality of notches that are uniformly distributed around the outer perimeter of the patch.

* * * * *